April 7, 1970     D. J. WYROUGH     3,504,889
PORTABLE VEHICLE LIFT
Filed March 18, 1968
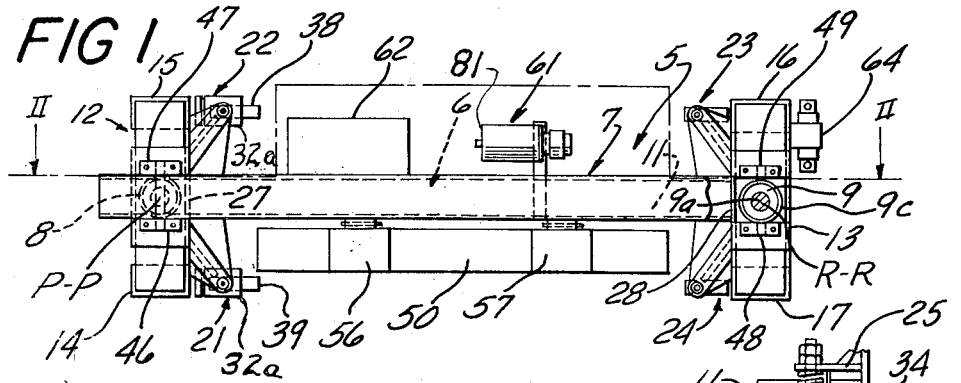
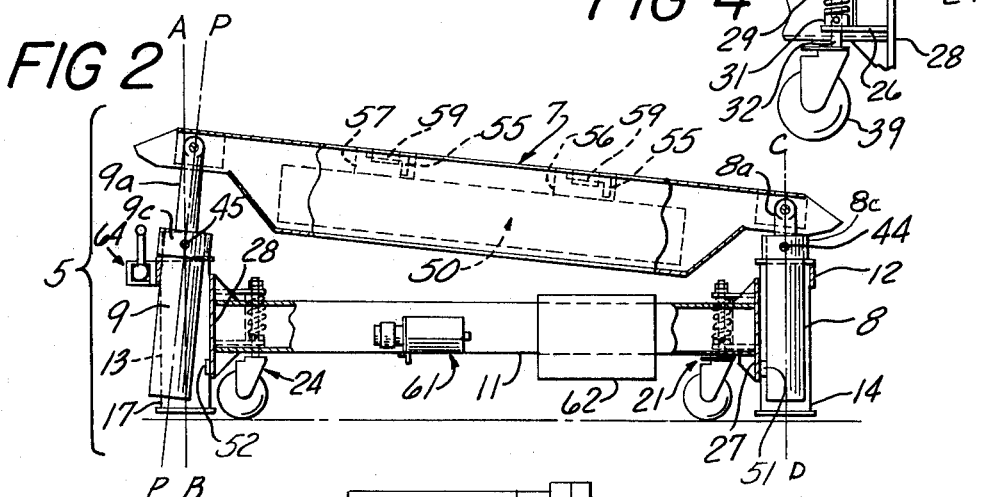
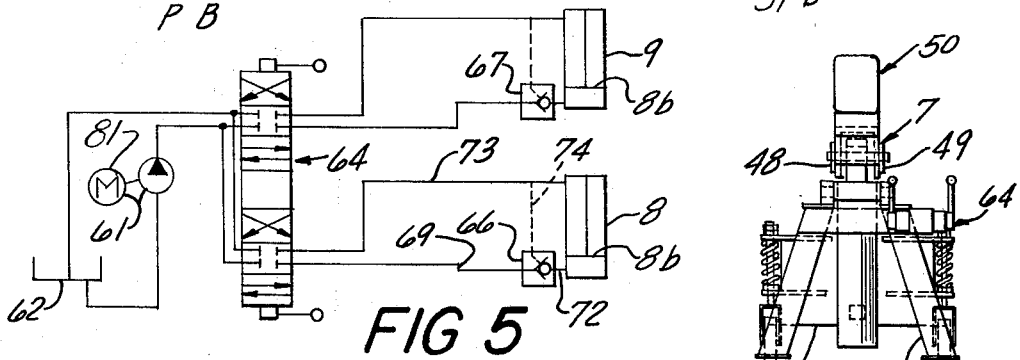
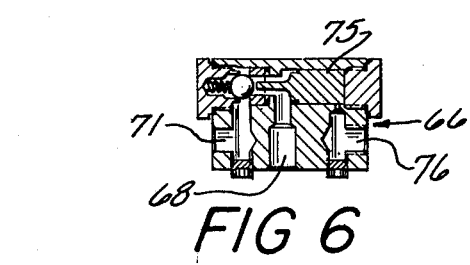
INVENTOR
DAVID J. WYROUGH
BY *M.M.Portz*
ATTORNEY United States Patent Office 3,504,889
Patented Apr. 7, 1970

3,504,889
PORTABLE VEHICLE LIFT
David J. Wyrough, Roxboro, N.C., assignor to Midland-Ross Corporation, Cleveland, Ohio, a corporation of Ohio
Filed Mar. 18, 1968, Ser. No. 713,682
Int. Cl. B60p 1/00; B66f 3/24
U.S. Cl. 254—2                                  9 Claims

ABSTRACT OF THE DISCLOSURE

A portable lift readily movable on casters or the like which provides a lifting beam adapted to be positioned, e.g., under a trailer or a truck body in transverse relation to its length, usually near the end of the body. To enable adjustment of the floor of a vehicle body into congruent relation with a dock or other platform, either end of the beam is adjustable independently of the other by a mechanical arrangement involving beam-lifting units which are tiltable with respect to a base or trestle of the lift.

In loading or unloading vehicles at freight terminals, warehouses, docks, and the like, usual practice is to transfer lading between the tail gate of the vehicle body and an immobile platform or deck. It is highly advantageous in the movement of fork lift trucks, wheel-barrows, or even persons from the stationary shipping platform into a truck or vice versa, if the juxtaposed floor of the vehicle and the platform are firmly supported at the same level and transverse inclination. Portable lifts of this general type are known but are deemed more mechanically complex than necessary. For example, one type of lift utilizes two vertical jacks in fixed supported relation with each other which are bridged by a beam connected to the tops of both jacks. If the jacks are made separately adjustable to different heights, then the beam must be adjustably connected to the jacks for relative lateral adjustment. Such a design is considered mechanically complex and involves relatively slidable parts which are a source of wear and eventual looseness.

It is a principal object of the invention to provide a portable power lift of general utility in lifting loads which are to be maintained at a desired alignment of the plane along which the load is supported when raised to a higher position. This object has especially in mind a lift suitable for raising the floor of one end of a truck body or highway cargo trailer into planate or edge-to-edge registry with other cargo or lading-supporting surfaces.

Another object is to provide a lift capable of establishing a plane of support for a load lifted thereby through operation of a functionally coordinated mechanical arrangement of simple and economical design.

A further object is to provide a lift in accordance with foregoing objects wherein the thrust of the jacks may be applied to a biased beam in a manner which minimizes or reduces side stresses on the jacks. This is especially advantageous in the use of hydraulic jacks wherein there is a need to minimize the deformation and the wear on seals and cylindrical metal components in sliding telescoping relationship.

These and other objects are achieved in a vehicle lift comprising a trestle, a lifting beam supported thereon, and a pair of horizontally-spaced vertically-expandable jacks spanned by the beam acting between the trestle and the beam wherein the principal feature of the invention is pivotal support of the jacks by the trestle along parallel, normally horizontal axes. This feature occurs in combination with mechanism for separately actuating the jacks, and stops on the trestle for limiting the tilting movements of the jack. In a preferred embodiment, the stops prevent upper portions of the jacks from moving outwardly from a region between two generally vertical planes containing the longitudinal axes of the jacks at retracted neutral position wherein the length of the beam is perpendicular to the axes of the jacks.

FIG. 1 is a plan view of a vehicle lift in accordance with the invention with a portion of its lifting beam cut away to expose upper structure of a cylinder;

FIG. 2 is an elevation view with foreground leg portions removed along a vertical plane of section indicated in FIG. 1;

FIG. 3 is an end elevation view of the lift of FIGS. 1 and 2;

FIG. 4 is a fragmentary enlarged elevation of one of the four caster assemblies of the lift;

FIG. 5 is a diagram of the hydraulic system for operating the lift of FIGS. 1 to 3; and FIG. 6 is a schematic section view of a pilot check valve indicated in FIG. 5.

With reference to general features of the lift 5 as shown in FIG. 1, the lift comprises a trestle 6, a beam 7, and jacks 8, 9 which are hydraulic cylinders in the embodiment ilustrated. The trestle comprises a girder 11 terminating an A-frame 12 and 13 fixed as by welding to ends of the girder. The A-frames provide four-point support of the lift through legs 14, 15, 16 and 17 of respective frames.

The trestle further comprises four caster assemblies 21, 22, 23, and 24 of similar construction. For example, the caster assembly 24 (see FIG. 4) comprises an upper support bracket 25 and a lower support bracket 26 fixedly attached to a plate 28. The bracket 26 is larger than bracket 25 and is also welded to the girder 11. In the present embodiment, one side of the plate 28 is welded to the inner side of the A-frame 13 and its other side is welded to the girder 11. The plate 28 and an analogous plate 27 thus function as intermediate elements of the trestle for joining the girder 11 to respective adjacent A-frames.

The bracket 25 is spaced above bracket 26 at sufficient height to receive a compression spring 29 which acts between the bracket 25 and a collar 31 fixed to a caster shaft 32. When not loaded, the lift is supported free of the ground or other base by action of the springs in the caster assemblies to force the wheels, e.g., wheel 39, to a level below the floor engaging plane of the trestle. As shown, the bracket 25 is much narrower than the bracket 26 and is welded only to the plate 28. It is reinforced and supported against reaction of the spring 32 to compression by a vertical web 34 welded to both brackets. The caster shaft and axle member 32 extend below the bracket 26 to enable upward movement of the shaft portion through the brackets as the lift, when loaded, settles toward the ground or other supporting surfaces until the bottom of the legs 14 to 17 engage the ground as a result of upward yielding of the four caster shafts and respective caster wheels 36 to 39 rotatably attached thereto. In assemblies 21, 22, horizontal plate elements 32a are attached to the lower part of the shaft 22 to optionally lock the caster wheels in a desired orientation facilitating the guiding of the lift when transferred from position to position.

FIG. 3 illustrates the lift in a condition wherein the beam 7 is completely retracted with respect to the trestle 6 and jacks 8 and 9. FIG. 2 illustrates the lift in a condition wherein the jack 8 is vertically expanded to a minor extent and the jack 9 is extended to a substantially greater extent to cause the beam 7 to be inclined out of parallel relation with the girder 11. Because the piston rods 8a and 9a of cylinders 8 and 9, respectively, are connected with the beam 7 along pivotal joints of fixed centers in respect to the beam, one jack or the other must tilt out of its respective plane of the two parallel vertical planes A–B and C–D in which the cylinder axes P—P and R—R are disposed at maximum retracted position of the beam 7. The tilting of a cylinder is proportional to the difference in the distances through which both piston rods have moved outwardly of respective cylinders. As shown in FIG. 2, the jack 9 has the greater extension and the beam 7 attached thereto has undergone tilting in proportion to the difference in contemporaneous expansion of the two jacks. Jacks 8 and 9 tilt on trunnions disposed along axes 44 and 45, respectively, which are fixed with respect to the trestle and extend through bearing pairs of blocks 46, 47 and 48, 49, respectively. Noting cylinder 9, for example, its trunnions are anchored in a collar 9c affixed by welding or other means to an upper exterior surface portion of the cylinder. The cylinder 8 is similarly provided with a collar 8c. The lower portions of the cylinders 8 and 9 are limited in movement inwardly toward the center of the lift by stops 51 and 52, respectively, secured to plates 27 and 28, respectively. Each stop 51, 52 is disposed with respect to the cylinder engaged thereby to limit tilting movement of the cylinder in the direction which would carry the upper vertically movable elements of the jacks, e.g., piston rods 8a, 9a, away from the region between the vertical planes A–B, C–D. The lower portions of the jacks are in approximate engagement with stops 51, 52 at lowest or fully retracted position of the beam 7.

In order to accommodate the trailer lift 5 to vehicles of varying clearances with the highway, it is necessary that the jacks or cylinders 8 and 9 be of limited height so that beam 7 may be moved under the under frames of vehicles having relatively low clearances. For example, the lift may have a retracted height of 28 inches at unloaded condition wherein the lift is supported by its caster wheels with the legs of the A-frames an inch or so off the ground. When the lift is of this height it is difficult to build the hydraulic cylinders 8 and 9 to a length of greater than about 20 inches. With a cylinder length of 20 inches, the maximum piston rod stroke, i.e., the movement range of the beam 7 is about 18 inches.

Hence, the vertical range of the lift may be substantially increased by a secondary beam 50 hinged to the primary means 7 by hinges 51 and 52 in the form of pintles 54, 55 welded to stanchions 56, 57 of the secondary beam 50, and sockets 58, 59 for receiving the pintles. When not needed for the vehicle range it provides, the beam 50 may be folded down at the side of the beam 7 as shown in FIGS. 1 and 2. The secondary beam has a height preferably less than the vertical range of extension of the hydraulic cylinders, and in a trailer lift proportioned as described above and herein illustrated, the height of the beam 50 above the under-surfaces of the stanchions 56, 57 may be of the order of ten inches. This height represents the additional height to which cylinders 8, 9 would have to be constructed to achieve a similar range.

The diagram of FIG. 4 illustrates a hydraulic system incorporated in the lift 5 which includes a motor-pump unit 61 connected with a reservoir 62 for withdrawing oil therefrom and passing it through a duplex directional control valve 64 having sufficient ports for passing oil to, and returning it from, the cylinders 8 and 9. As known from standard draft symbols, the valve 64 is capable of reversing the flow of oil to either cylinder independently of the other cylinder. Safety and positive holding of either jack in a desired elevation is assured by the use of single pilot check valves 66 and 67 having an internal configuration as shown in FIG. 6 enabling the valve to hold a piston 8b or 9b thereof in a raised position in addition to the holding power of the valve 64. FIG. 6 is to be noted as to the internal structure of valves 66, 67. In valve 66, a port 68 receives oil through a line 69 of the system whereas during the reversal, port 71 receives oil directly from the cylinder through a line 72 wherein pressure is exerted on piston 8b through a line 73. Pressure from line 73 acts on a piston 75 of the pilot check valve through a line 74 connected with a port 76 to traverse the piston 75 against the ball 77 and produce unseating thereof in a manner known in the valve art. In this manner, the check valves 66, 67 are taken out of operation when it is desired to lower the lift.

The motor 81 of the unit may be selected in accordance with the voltage most available within the environment in which it is to be used. In general, a 110 volt, 60 cycle motor, as motor 81, is easily connected to electrical plug-in outlet provided in loading docks. In other locations, the lift is preferably equipped with a 12 volt direct current motor and a cable with terminals suitable for connection with the battery of a trailer tractor or self-propelled truck.

What is claimed is:
1. A portable lift comprising:
a trestle;
a pair of vertically expandable jacks, each having a base and an upper member telescoping therewith;
means for separately expanding the jacks;
pivotal means for supporting the jacks in opposite end portions of the trestle, said means connecting each of said bases to the trestle along one of two horizontal axes extending in fixed transverse relation to the trestle length about which axes the jacks are tiltable, said axes being contained by two generally vertical planes;
a beam spanning, and pivotally joining with, an upper portion of each of said members along axes having fixed spacing within the beam, said jacks being aligned transversely of the length of the beam to enable tilting of one jack relative to the trestle throughout a range of differences in contemporaneous expansion of the two jacks; and
stop means on the trestle for engaging each base and, when engaged, limiting movement thereof in a direction carrying its corresponding said member outwardly of the region between said vertical planes.

2. A portable lift comprising:
a trestle;
a pair of vertically expandable jacks, each having a base and an upper member telescoping therewith;
pivotal means for supporting the jacks in opposite end portions of the trestle, said means connecting said bases and the trestle along two substantially horizontal parallel axes contained in two generally-vertical parallel planes about which axes of the jacks are tiltable relative to the trestle;
a beam spanning, and pivotally joining with, upper portions of said members along two axes generally parallel to said horizontal axes; and
stop means on the trestle for engaging each base and, when engaged, limiting movement thereof in a direction carrying its corresponding said member outwardly of the region between said vertical planes.

3. The portable lift of claim 1 wherein:
each jack is expandable along an expansion axis; and
said stop means for each jack is disposed relatively thereto to engage and thereby position said jack with its expansion axis in substantially perpendicular relation with the length of said beam.

4. The lift of claim 1 wherein:
each jack is expandable along an expansion axis; and
said stop means for each jack is disposed relatively thereto to establish approximate parallelism between both expansion axes when both jacks are engaged with respective stop means.

5. The portable lift of claim 1 comprising:
a plurality of caster wheel assemblies mounted on said trestle; each assembly comprising a caster wheel, and downwardly-urged resiliently-supported axle means for supporting the associated caster wheel at a level below a floor-engaging plane of the trestle.

6. The portable lift of claim 1 comprising:
a second beam in hinged relation with said first-named beam along an axis extending lengthwise of both beams and disposed below an upper load-supporting surface of the first beam, said second beam being swingable from a lower position below said upper surface to an upper position wherein a lower surface of the second beam rests on said upper surface.

7. The portable lift of claim 1 comprising:
power means and control means therefor mounted on the trestle for separately actuating and controlling expansion and contraction of each jack.

8. The portable lift of claim 1 wherein:
said jacks are fluid-operated and the lift comprises a fluid supply means connected with the jacks, electrical power means for driving the supply means, said power means being matched with an electrical power source of a highway trailer tractor and including means adapting it to be connected with said power source.

9. A portable lift of claim 1 wherein said jacks are fluid-operated and the lift comprises:
a fluid supply means connected with the jacks;
electrical power means for driving the supply means; and
valve means in means for connecting the supply means and the jacks for selectively and simultaneously directing the fluid to said jacks.

References Cited
UNITED STATES PATENTS

| | | | |
|---|---|---|---|
| 1,942,272 | 1/1934 | Bizzarri | 254—2.6 X |
| 2,449,863 | 9/1948 | Ross | 254—2.6 |

OTHELL M. SIMPSON, Primary Examiner

D. R. MELTON, Assistant Examiner

U.S. Cl. X.R.

254—93